(12) United States Patent
Gibson et al.

(10) Patent No.: US 7,668,529 B2
(45) Date of Patent: Feb. 23, 2010

(54) AUDIO SYSTEMS AND METHODS

(75) Inventors: Timothy P. Gibson, Overland Park, KS (US); Jeffrey K. Hunter, Olathe, KS (US)

(73) Assignee: Honeywell International Inc., Morristown, NJ (US)

( * ) Notice: Subject to any disclaimer, the term of this patent is extended or adjusted under 35 U.S.C. 154(b) by 994 days.

(21) Appl. No.: 11/196,303

(22) Filed: Aug. 4, 2005

(65) Prior Publication Data

US 2007/0030585 A1  Feb. 8, 2007

(51) Int. Cl.
H04M 11/04  (2006.01)

(52) U.S. Cl. .................. 455/404.1; 455/3.01; 455/3.05; 455/3.06; 455/414.1; 455/414.3; 455/450; 455/452.1; 455/455; 455/458; 455/567; 455/218; 455/219; 455/221

(58) Field of Classification Search ....... 455/3.01–3.06, 455/404.1–404.2, 414.1–414.3, 450, 452.1, 455/455, 458, 567, 218–221
See application file for complete search history.

(56) References Cited

U.S. PATENT DOCUMENTS

| | | | | |
|---|---|---|---|---|
| 5,495,283 A | * | 2/1996 | Cowe | ........................... 725/33 |
| 5,708,662 A | * | 1/1998 | Takashima | ................... 370/496 |
| 6,169,894 B1 | * | 1/2001 | McCormick et al. | ...... 455/414.1 |
| 6,397,076 B1 | * | 5/2002 | Brown et al. | ................. 455/521 |
| 7,324,003 B2 | * | 1/2008 | Yun | ........................... 340/601 |
| 7,330,693 B1 | * | 2/2008 | Goss | ......................... 455/3.01 |

* cited by examiner

*Primary Examiner*—Tuan A Tran
(74) *Attorney, Agent, or Firm*—Fogg & Powers LLC

(57) ABSTRACT

An audio system may comprise a transceiver configured to receive, detect, and transmit audio signals on a first channel frequency and to receive and detect audio signals on at least one additional channel frequency. The at least one additional channel frequency may include a second channel frequency. The system may include a controller configured to output a first audio cue while outputting audio signals received from the at least one additional channel frequency, to output a second audio cue at a time when the controller begins outputting an audio signal received from the first channel frequency, and to output a third audio cue at a time when the controller begins outputting an audio signal received from the second channel frequency. The first, second, and third audio cues may be different from one another.

19 Claims, 2 Drawing Sheets

AUDIO SYSTEMS AND METHODS

TECHNICAL FIELD

The present invention is directed to audio systems and methods and, more particularly, to audio systems and methods for aviation communication.

BACKGROUND

Some conventional audio systems, for example, aviation communication systems, may include a transceiver capable of receiving and transmitting audio signals on a first frequency and receiving audio signals on a second frequency. Such systems may also include a device for outputting the audio signals. In such conventional systems, a user may not be aware of a change in source of the audio signal being output by the system.

For example, if a user is listening to secondary audio, for example, an automated weather transmission, the user may not be paying close attention to the audio being output. If audio signals from a control tower are then received and outputted by the system, the user may not immediately detect the change in audio source. Consequently, the user may miss important information or require the control tower to repeat information. Systems and methods for solving one or more of the above problems may be desirable.

For example, it may be desirable to provide systems and methods for notifying a user of a change in audio source, so that the user can focus attention when the source of the audio is of high priority, for example, a control tower or an emergency broadcast. It may be desirable to provide systems and methods that continually or periodically inform a user as to the source of the audio signal.

The audio systems and methods of the present invention solve one or more of the problems set forth above.

SUMMARY OF THE INVENTION

According to various aspects, an audio system may comprise a transceiver configured to receive, detect, and transmit audio signals on a first channel frequency and to receive and detect audio signals on at least one additional channel frequency. The at least one additional channel frequency may include a second channel frequency.

The system may include a controller configured to output a first audio cue while outputting audio signals received from the at least one additional channel frequency, to output a second audio cue at a time when the controller begins outputting an audio signal received from the first channel frequency, and to output a third audio cue at a time when the controller begins outputting an audio signal received from the second channel frequency. The first, second, and third audio cues may be different from one another.

In accordance with various aspects, a method of audio communication may comprise receiving, detecting, and transmitting audio signals on a first channel frequency with a transceiver and receiving and detecting audio signals on at least one additional channel frequency with the transceiver. The at least one additional frequency may include a second channel frequency. The method may include outputting a first audio cue while outputting an audio signal received from the second channel frequency, outputting a second audio cue at a time when outputting of an audio signal from the first channel frequency commences, and outputting a third audio cue at a time when outputting of an audio signal from the second channel frequency commences. The first, second, and third audio cues may be different from one another.

DETAILED DESCRIPTION

Figure 1:
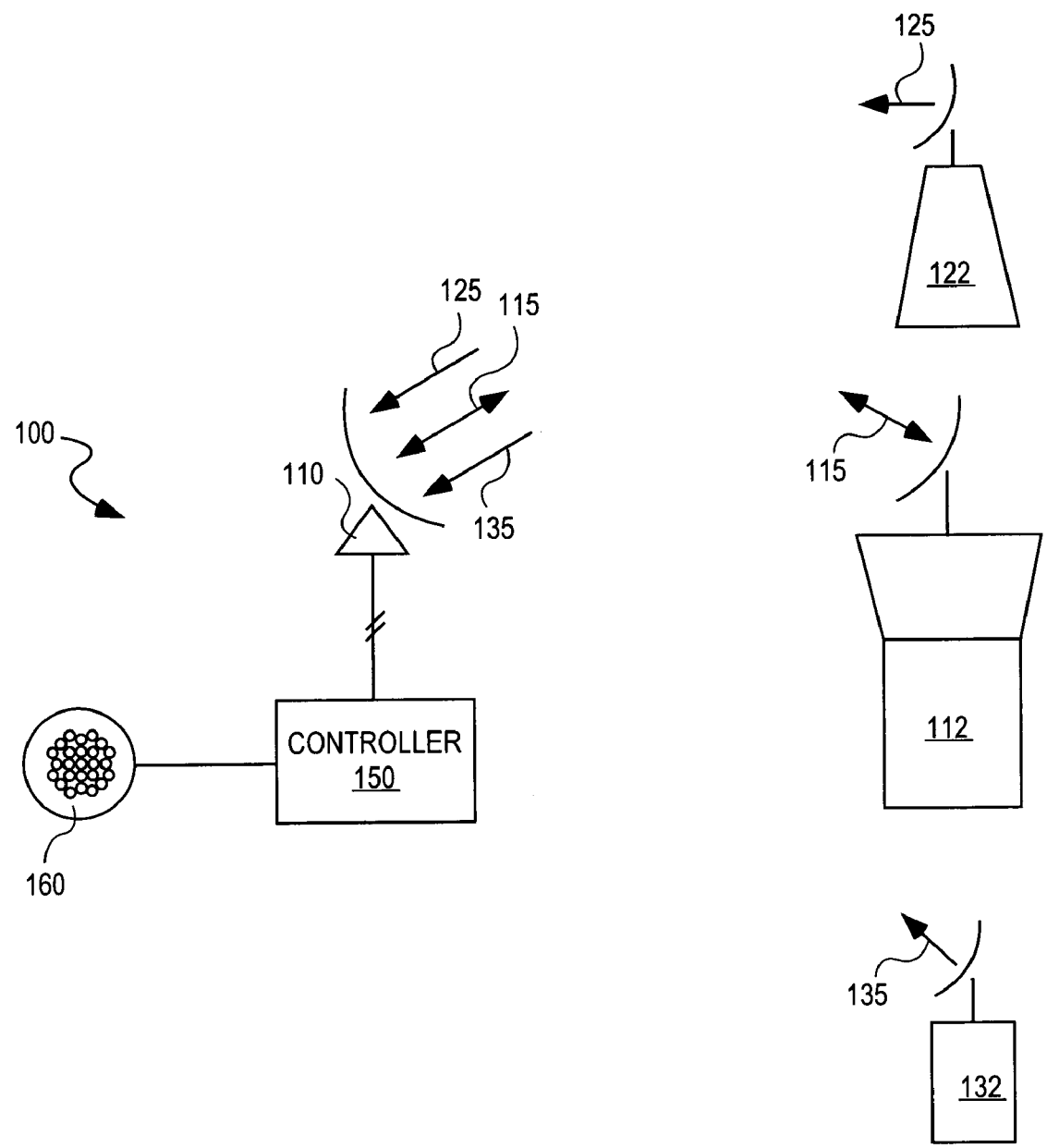
FIG. 1 is a diagram of an exemplary audio system in accordance with various aspects of the disclosure.

An exemplary embodiment of an audio system 100 is illustrated in FIG. 1. The audio system 100 may comprise a transceiver 110 and a controller 150. The transceiver 110 may be configured to receive, detect, and transmit audio signals on a first channel frequency 115. The transceiver 110 may also be configured to receive audio signals from one or more additional channel frequencies 125, 135.

Each of the channel frequencies 115, 125, 135 may be associated with a different source 112, 122, 132. For example, according to various aspects, the audio system 100 may comprise an aviation communication system in an aircraft, the transceiver 110 may comprise an aviation communication transceiver, the first source 112 may comprise a control tower, and the additional sources 122, 132 may comprise an automatic weather reporting station, an emergency broadcast system, a communication system associated with another aircraft, or the like.

The controller 150 may be electrically coupled with the transceiver 110 and an output device 160. The output device 160 may comprise, for example, one or more speakers. The controller 150 may be configured to prioritize the audio signals received by the transceiver 110 and output the highest priority signal. The controller 150 may determine the prioritization according to desired criteria that may be predetermined, user-selectable, or a combination thereof. The controller 150 may be configured to output audio from only one of the channel frequencies 115, 125, 135 at any given time.

According to various aspects, the controller 150 may be configured to output an audio cue with the outputted audio signal to notify a user that the outputted audio signal is from one of the additional sources 122, 132. The audio cue may be outputted periodically or continuously during the outputting of audio from the additional source.

According to some aspects, the controller 150 may be configured to output an audio cue when it begins to output an audio signal from a different source than that of the audio signal currently being output.

For example, if the controller 150 is outputting an audio signal received from a second source, e.g., additional source 122, but then determines that an audio signal received from the first source 112 is to be output because it takes higher priority, the controller 150 may output an audio cue to notify the user of the change in source of the audio signal. The audio cues may differ for each source, thus providing a user with an indication as to the source of the audio signal.

According to various aspects, in an exemplary audio system 100, for example, an aircraft communication system, the first source 112 may comprise a control tower, the second source 122 may comprise an automatic weather reporting station, and a third source 132 may comprise an emergency broadcast system.

According to various exemplary aspects, the controller 150 may be configured to output a first audio cue while outputting an audio signal received from the second source 122. The first audio cue may be outputted periodically throughout all or a portion of the time period when the audio of the second source 122 is outputted. Alternatively, the first audio cue may be outputted continuously throughout a time period when the audio of the second source 122 is outputted.

According to some aspects, the controller 150 may be configured to output a second audio cue at a time when the controller 150 commences output of an audio signal received from the first audio source 112 via the first channel frequency 115. The second audio cue may be outputted instantaneously at the commencement of output of the audio signal from the first audio source 112, or it may be overlaid onto the audio signal from the first audio source 112 for a few seconds. The second audio cue may be different from the first audio cue.

According to various aspects, the controller 150 may be configured to output a third audio cue at a time when the controller 150 commences output of an audio signal received from the second audio source 122 via the second channel frequency 125. The third audio cue may be outputted instantaneously at the commencement of output of the audio signal from the second audio source 122, or it may be overlaid onto the audio signal from the second audio source 122 for a few seconds. The third audio cue may be different from the first audio cue and/or the second audio cue.

According to some aspects, the controller 150 may be configured to output audio from the first source 112 whenever the first channel frequency 115 breaks squelch. If the controller 150 is outputting an audio signal received from one of the additional sources 122, 132 when the first channel frequency 115 breaks squelch, the controller 150 ceases outputting audio from the additional source and begins outputting audio from the first source 112. The second audio cue may be outputted when the controller 150 commences outputting the audio from the first source 112 to indicate to a user a change of source. According to various aspects, the controller 150 may be configured to output the second audio cue when the first channel frequency 115 breaks squelch, even if no additional channel frequency has broken squelch, to indicate to a user that an audio signal from the first audio source 112 is being outputted.

According to various aspects, the controller 150 may be configured to output audio received from the second source 122 at any time that the first channel frequency 115 has not broken squelch, that is, any time when the controller 150 is not outputting an audio signal received from the first source 112. The controller 150 may be configured to output the third audio cue when the controller 150 begins outputting an audio signal received from the second source 122 via the second channel frequency 125 and the first channel frequency 115 has not broken squelch. The controller 150 may also output the third audio cue when the first channel frequency 115 ceases breaking squelch, allowing an audio signal from the second source 122 that has broken squelch to be outputted.

According to some exemplary aspects, the controller 150 may be configured to output audio received from a third source, e.g., additional source 132, at any time that the first and second channel frequencies 115, 125 have not broken squelch, that is, any time when the controller 150 is not outputting an audio signal received from the first source 112 or the second source 122. The controller 150 may be configured to output a fourth audio cue when the controller 150 begins outputting an audio signal received from the third source 132 via the third channel frequency 135 and the first and second channel frequencies 115, 125 have not broken squelch. The controller 150 may also output the fourth audio cue when the first or second channel frequency 115, 125 ceases breaking squelch, allowing an audio signal from the third source 132 that has broken squelch to be outputted. The fourth audio cue may be different than the first, second, and/or third audio cues.

It should be appreciated that in an exemplary audio system 100, for example, an aircraft communication system, including two audio sources, the first source 112 may comprise a control tower and the second source 122 may comprise an automatic weather reporting station. It should be appreciated that in an exemplary audio system 100, for example, an aircraft communication system, including three audio sources, the first source 112 may comprise a control tower, the second source 122 may comprise an emergency broadcast system, and a third source 132 may comprise an automatic weather reporting station. It should further be appreciated that the exemplary audio system 100 may include more than three audio sources, which may be prioritized in a manner similar to the exemplary systems discussed above.

Figure 2:
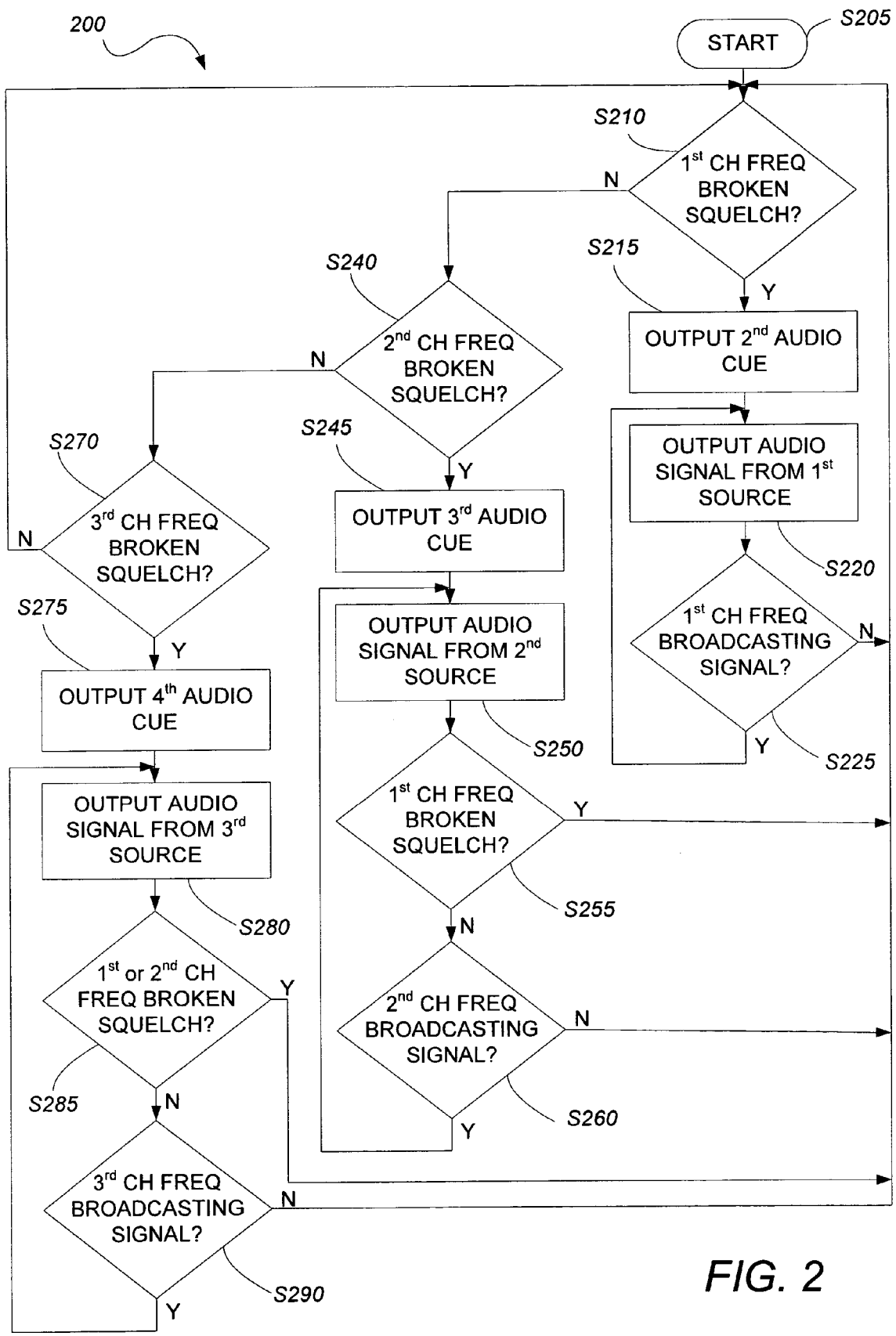
FIG. 2 is a flow chart illustrating an exemplary method of audio communication in accordance with various aspects of the disclosure.

Referring now to FIG. 2, an exemplary method 200 for audio communication, for example, aviation communication, is provided. Control commences in step 205 when the audio system 100 is activated.

In step S210, the controller 150 determines whether the first channel frequency 115 has broken squelch. If the first channel frequency 115 has broken squelch, control continues to step S215. If the first channel frequency has not broken squelch, control skips to step S240, described below.

In step S215, the controller 150 begins outputting an audio cue, e.g., the second audio cue, indicative of commencing output of an audio signal from the first source 112. The audio cue may be outputted instantaneously at the commencement of output of the audio signal from the first audio source 112, or it may be overlaid onto the audio signal from the first audio source 112 for a few seconds. Control continues to step S220 where the audio signal received from the first source 112 via the first channel frequency 115 is outputted. Control then continues to step S225.

Next, in step S225, the controller 150 determines whether an audio signal is still being received from the first source 112. If an audio signal is still being received from the first source, control returns to step S220, where the audio signal from the first source 112 continues to be output. Otherwise, in step S225, if the controller determines that an audio signal is no longer being received from the first source 112, control returns to step S210.

In step S240, the controller 150 determines whether the second channel frequency 125 has broken squelch. If the second channel frequency 115 has broken squelch, control continues to step S245. If the second channel frequency has not broken squelch, control skips to step S270, described below.

In step S245, the controller 150 begins outputting an audio cue, e.g., the third audio cue, indicative of commencing output of an audio signal from the second source 122. The audio cue may be outputted instantaneously at the commencement of output of the audio signal from the second audio source 122, or it may be overlaid onto the audio signal from the second audio source 122 for a few seconds. Control continues to step S250 where the audio signal received from the second source 122 via the second channel frequency 125 is outputted. In step S250, the controller 150 may also output an audio cue, e.g, the first audio cue, indicative of continual output of an audio signal from the second source 122. The first audio cue may be outputted periodically throughout all or a portion of the time period when the audio of the second source 122 is outputted. Alternatively, the first audio cue may be outputted continuously throughout a time period when the audio of the second source 122 is outputted. Control then continues to step S255.

Next, in step S255, the controller 150 determines whether the first channel frequency 115 has broken squelch. If the first channel frequency 115 has broken squelch, control returns to step S215, described above. Otherwise, control continues to step S260.

Then, in step S260, the controller 150 determines whether an audio signal is still being received from the second source 122. If an audio signal is still being received from the second source 122, control returns to step S250, where the audio signal from the second source 122 continues to be output. Otherwise, in step S260, if the controller determines that an audio signal is no longer being received from the second source 122, control returns to step S210.

In step S270, the controller 150 determines whether the third channel frequency 135 has broken squelch. If the third channel frequency 135 has broken squelch, control continues to step S275. If the third channel frequency has not broken squelch, control returns to step S210, described above.

In step S275, the controller 150 begins outputting an audio cue, e.g., the fourth audio cue, indicative of commencing output of an audio signal from the third source 132. The fourth audio cue may be outputted instantaneously at the commencement of output of the audio signal from the third audio source 132, or it may be overlaid onto the audio signal from the third audio source 132 for a few seconds. Control continues to step S280 where the audio signal received from the third source 132 via the third channel frequency 135 is outputted. In step S280, the controller 150 may also output an audio cue, e.g, the fifth audio cue, indicative of continual output of an audio signal from the third source 132. The fifth audio cue may be outputted periodically throughout all or a portion of the time period when the audio of the third source 132 is outputted. Alternatively, the fifth audio cue may be outputted continuously throughout a time period when the audio of the third source 132 is outputted. Control then continues to step S285.

Next, in step S285, the controller 150 determines whether the first channel frequency 115 or the second channel frequency 125 has broken squelch. If the first or second channel frequency 115, 125 has broken squelch, control returns to step S210, described above. Otherwise, control continues to step S290.

Then, in step S290, the controller 150 determines whether an audio signal is still being received from the third source 132. If an audio signal is still being received from the third source 132, control returns to step S280, where the audio signal from the third source 132 continues to be output. Otherwise, in step S290, if the controller determines that an audio signal is no longer being received from the third source 122, control returns to step S210.

It will be apparent to those skilled in the art that various modifications and variations can be made to the audio systems and methods of audio communication of the present invention without departing from the scope of the invention. Other embodiments of the invention will be apparent to those skilled in the art from consideration of the specification and practice of the invention disclosed herein. It is intended that the specification and examples be considered as exemplary only.

What is claimed is:

1. An audio system, comprising:
    a transceiver configured to receive, detect, and transmit audio signals on a first channel frequency and to receive and detect audio signals on at least one additional channel frequency, the at least one additional channel frequency including a second channel frequency; and
    a controller configured to output a first audio cue while outputting audio signals received from said at least one additional channel frequency, to output a second audio cue at a time when the controller begins outputting an audio signal received from the first channel frequency, and to output a third audio cue at a time when the controller begins outputting an audio signal received from the second channel frequency, the first, second, and third audio cues being different from one another.

2. The system of claim 1, wherein the controller is configured to output audio signals from no more than one of the first and additional channel frequencies at any given time.

3. The system of claim 2, wherein the controller is configured to output audio signals from the first channel frequency at a time when the first channel frequency breaks squelch.

4. The system of claim 3, wherein the controller is configured to output the second audio cue at a time when the first channel frequency breaks squelch and the second channel frequency has not broken squelch and at a time when the first channel frequency breaks squelch interrupting the second channel frequency that has broken squelch.

5. The system of claim 2, wherein the controller is configured to output an audio signal from the second channel frequency at a time when the first channel frequency has not broken squelch.

6. The system of claim 5, wherein the controller is configured to output the third audio cue at a time when the second channel frequency breaks squelch and the first channel frequency has not broken squelch and at a time when the first channel frequency ceases breaking squelch allowing audio from the second channel frequency that has broken squelch to be output.

7. The system of claim 2, wherein the controller is configured to output an audio signal from any one of the additional channel frequencies at a time when no higher priority channel frequency has broken squelch.

8. The system of claim 7, wherein the controller is configured to output a unique audio cue at a time when the additional channel frequency breaks squelch and no higher priority channel frequency has broken squelch and at a time when a higher priority channel frequency ceases breaking squelch allowing audio from the additional channel frequency that has broken squelch to be output.

9. The system of claim 1, wherein the second and third audio cues are instantaneous, and wherein the first audio cue is outputted either periodically or continuously throughout a time period when the audio of the second channel frequency is outputted.

10. The system of claim 1, wherein the transceiver comprises an aviation communication transceiver.

11. A method of audio communication, comprising:
    receiving, detecting, and transmitting audio signals on a first channel frequency with a transceiver;
    receiving and detecting audio signals on at least one additional channel frequency with the transceiver, the at least one additional frequency including a second channel frequency;
    outputting a first audio cue while outputting an audio signal received from the second channel frequency;
    outputting a second audio cue at a time when outputting of an audio signal from the first channel frequency commences; and outputting a third audio cue at a time when outputting of an audio signal from the second channel frequency commences, the first, second, and third audio cues being different from one another.

12. The method of claim 11, further comprising outputting audio signals from no more than one of the first and additional channel frequencies at any given time.

13. The method of claim 12, further comprising outputting audio signals from the first channel frequency at a time when the first channel frequency breaks squelch.

14. The method of claim 13, wherein said outputting a second audio cue comprises outputting the second audio cue at a time when the first channel frequency breaks squelch and the second channel frequency has not broken squelch and at a time when the first channel frequency breaks squelch interrupting the second channel frequency that has broken squelch.

15. The method of claim 12, further comprising outputting an audio signal from the second channel frequency at a time when the first channel frequency has not broken squelch.

16. The method of claim 15, wherein said outputting a third audio cue comprises outputting the third audio cue at a time when the second channel frequency breaks squelch and the first channel frequency has not broken squelch and at a time when the first channel frequency ceases breaking squelch allowing audio from the second channel frequency that has broken squelch to be output.

17. The method of claim 12, further comprising outputting an audio signal from any one of the additional channel frequencies at a time when no higher priority channel frequency has broken squelch.

18. The method of claim 17, further comprising outputting a unique audio cue at a time when the additional channel frequency breaks squelch and no higher priority channel frequency has broken squelch and at a time when a higher priority channel frequency ceases breaking squelch allowing audio from the additional channel frequency that has broken squelch to be output.

19. The method of claim 11, wherein the second and third audio cues are instantaneous, and wherein the first audio cue is outputted either periodically or continuously throughout a time period when the audio of the second channel frequency is output.

\* \* \* \* \*

UNITED STATES PATENT AND TRADEMARK OFFICE
CERTIFICATE OF CORRECTION

PATENT NO. : 7,668,529 B2  Page 1 of 1
APPLICATION NO. : 11/196303
DATED : February 23, 2010
INVENTOR(S) : Gibson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1238 days.

Signed and Sealed this

Seventh Day of December, 2010

David J. Kappos
*Director of the United States Patent and Trademark Office*